(12) United States Patent
Choi et al.

(10) Patent No.: US 10,230,900 B2
(45) Date of Patent: Mar. 12, 2019

(54) APPARATUS FOR CONTROLLING EXPOSURE OF MULTI-VIEW CAMERA, SYSTEM INCLUDING THE SAME, AND METHOD FOR CONTROLLING EXPOSURE OF MULTI-VIEW CAMERA

(71) Applicants: HYUNDAI MOTOR COMPANY, Seoul (KR); KIA MOTORS CORPORATION, Seoul (KR); Korea Advanced Institute of Science and Technology, Daejeon (KR)

(72) Inventors: Jin Wook Choi, Goyang-si (KR); In Wook Shim, Daejeon (KR); Tae Hyun Oh, Daejeon (KR); In So Kweon, Daejeon (KR)

(73) Assignees: HYUNDAI MOTOR COMPANY, Seoul (KR); KIA MOTORS CORPORATION, Seoul (KR); Korea Advanced Institute of Science and Technology, Daejeon (KR)

( * ) Notice: Subject to any disclaimer, the term of this patent is extended or adjusted under 35 U.S.C. 154(b) by 190 days.

(21) Appl. No.: 15/367,041

(22) Filed: Dec. 1, 2016

(65) Prior Publication Data
US 2018/0115694 A1 Apr. 26, 2018

(30) Foreign Application Priority Data
Oct. 20, 2016 (KR) .................. 10-2016-0136533

(51) Int. Cl.
*H04N 7/18* (2006.01)
*H04N 9/47* (2006.01)
(Continued)

(52) U.S. Cl.
CPC ......... *H04N 5/2353* (2013.01); *G06K 9/4661* (2013.01); *H04N 5/2351* (2013.01); *H04N 7/181* (2013.01)

(58) Field of Classification Search
None
See application file for complete search history.

(56) References Cited

U.S. PATENT DOCUMENTS

| 4,423,936 A | 1/1984 | Johnson |
| 5,592,256 A | 1/1997 | Muramatsu |
| (Continued) | | |

FOREIGN PATENT DOCUMENTS

| EP | 0596416 A1 | 5/1994 |
| EP | 0544804 B1 | 4/1996 |
| (Continued) | | |

OTHER PUBLICATIONS

Korean Office Action dated May 10, 2017 of corresponding Korean Patent Application No. 10-2016-0136533—6 pages.

*Primary Examiner* — Talha M Nawaz
(74) *Attorney, Agent, or Firm* — Knobbe Martens Olson & Bear LLP

(57) ABSTRACT

A system for controlling exposure of a multi-view camera is disclosed. The system includes a plurality of cameras having different views, a single image-based camera parameter calculator calculating single image-based camera parameters for each of the plurality of cameras; an image intensity ratio calculator calculating an image intensity ratio corresponding to an image intensity difference in an overlapped region between image data obtained from the plurality of cameras; and a multi-image-based camera parameter calculator calculating multi-image-based camera parameters for correcting intensity differences between images of the plu- (Continued)

rality of cameras on the basis of the single image-based camera parameters and the image intensity ratio.

14 Claims, 13 Drawing Sheets

(51) Int. Cl.
*H04N 5/235* (2006.01)
*G06K 9/46* (2006.01)

(56) References Cited

U.S. PATENT DOCUMENTS

| | | | |
|---|---|---|---|
| 6,636,646 | B1 | 10/2003 | Gindele |
| 7,289,154 | B2 | 10/2007 | Gindele |
| 8,013,909 | B2 | 9/2011 | Nikkanen et al. |
| 2006/0257024 | A1* | 11/2006 | Hahn ................ G06K 9/00791 |
| | | | 382/181 |
| 2008/0068012 | A1* | 3/2008 | Werthner ............. G01R 33/485 |
| | | | 324/309 |
| 2009/0021578 | A1 | 1/2009 | Yamazaki et al. |
| 2012/0069181 | A1* | 3/2012 | Xue ....................... G01J 3/0229 |
| | | | 348/148 |
| 2013/0136306 | A1* | 5/2013 | Li ........................... G02B 27/28 |
| | | | 382/103 |
| 2015/0344028 | A1* | 12/2015 | Gieseke ................ B60W 30/00 |
| | | | 701/1 |
| 2018/0045392 | A1* | 2/2018 | Winterer ............. F21S 48/1145 |

FOREIGN PATENT DOCUMENTS

| | | |
|---|---|---|
| JP | 2008-90605 A | 4/2008 |
| JP | 2011-160019 A | 8/2011 |
| JP | 2014-90411 A | 5/2014 |
| KR | 10-2007-0106641 A | 11/2007 |
| KR | 10-2013-0117565 A | 10/2013 |
| KR | 10-1634225 B1 | 6/2016 |
| KR | 10-1679279 B1 | 11/2016 |

* cited by examiner

APPARATUS FOR CONTROLLING EXPOSURE OF MULTI-VIEW CAMERA, SYSTEM INCLUDING THE SAME, AND METHOD FOR CONTROLLING EXPOSURE OF MULTI-VIEW CAMERA

CROSS-REFERENCE TO RELATED APPLICATION

This application is based on and claims the benefit of priority to Korean Patent Application No. 10-2016-0136533, filed on Oct. 20, 2016 in the Korean Intellectual Property Office, the disclosure of which is incorporated herein in its entirety by reference.

TECHNICAL FIELD

The present disclosure relates to an apparatus for controlling exposure of a multi-view camera, a system including the same, and a method for controlling exposure of a multi-view camera.

BACKGROUND

A dead zone or blind spot exists to a driver viewing a side view mirror or a rear view mirror while driving a vehicle. The dead zone may cause damage to the vehicle or threaten a life of a pedestrian positioned in the dead zone in the case in which the vehicle is parked or starts after being stopped even though the vehicle is driven at a low speed.

The problems described above have been overcome using a sensor, a camera, or the like. Typically, a method such as around view monitoring (AVM) has been utilized. The around view monitoring (AVM) is a method for assisting a driver to secure a visual field by converting images photographed using a plurality of wide angle cameras into narrow angle images as if a situation around the vehicle is viewed from the top of the vehicle and synthesizing the narrow angle images.

In the AVM up to now, camera parameters of each of the cameras are only independently adjusted, such that a difference in image quality between the cameras may be very large depending on an illumination condition, which has a significant influence on deterioration of AVM image quality. A post-processing method such as image equalization or image blending has been used in order to reduce the difference between the images described above. However, the existing methods described above may cause loss of an amount of information of the images themselves, and in the case in which a difference between obtained images is sever, the post-processing method is not enough to minimize the difference between the images.

SUMMARY

The present disclosure has been made to solve the above-mentioned problems occurring in the prior art while advantages achieved by the prior art are maintained intact.

An aspect of the present disclosure provides an apparatus for controlling exposure of a multi-view camera, a system including the same, and a method for controlling exposure of a multi-view camera capable of minimizing loss of image data and determining an optical exposure value by correcting camera parameters themselves of each of a plurality of cameras to correct a difference between overlapped images.

According to an embodiment of the present disclosure, a system for controlling exposure of a multi-view camera includes: a plurality of cameras having different views; a single image-based camera parameter calculator calculating single image-based camera parameters for each of the plurality of cameras; an image intensity ratio calculator calculating an image intensity ratio corresponding to an image intensity difference in an overlapped region between image data obtained from the plurality of cameras; and a multi-image-based camera parameter calculator calculating multi-image-based camera parameters for correcting intensity differences between the respective images of the plurality of cameras on the basis of the single image-based camera parameters and the image intensity ratio.

The system for controlling exposure of a multi-view camera may further include an exposure controller controlling exposure values of the plurality of cameras on the basis of the multi-image-based camera parameters.

The plurality of cameras may include at least one of a first camera photographing a front of a vehicle, a second camera photographing a left of the vehicle, a third camera photographing a right of the vehicle, and a fourth camera photographing a rear of the vehicle.

The single image-based camera parameter calculator may include: a virtual image generator changing intensities of each of the image data photographed in the plurality of cameras to generate a plurality of virtual images for each of the image data; a feature value image generator extracting feature values of each of the plurality of virtual images to generate a plurality of feature value images; and a parameter calculator calculating the single image-based camera parameters using a relationship between the feature values obtained from the plurality of feature value images and intensities.

The parameter calculator may calculate the single image-based camera parameters so as to be exponentially increased or decreased.

The image intensity ratio calculator may calculate the image intensity ratio on the basis of a median filtering algorithm and a mean filtering algorithm.

The image intensity ratio calculator may calculate a median of a value obtained by dividing a pixel mean value of image patches defined in first image data photographed in a first camera of the plurality of cameras by a pixel mean value of image patches defined in second image data photographed in a second camera of the plurality of cameras as the image intensity ratio, in an overlapped region between the first image data and the second image data.

The multi-image-based camera parameter calculator may include: a cost function deriver deriving a first cost function in which values of the single image-based camera parameters are reflected on the basis of an exposure value of a next frame by the single image-based camera parameters and deriving a second cost function in which values of the multi-image-based camera parameters are reflected on the basis of an exposure value of a current frame by the single image-based camera parameters and the image intensity ratio; and an optimal parameter calculator calculating camera parameters so that the first cost function and the second cost function are minimized.

The cost function deriver may derive the second cost function so that the intensity difference in the overlapped region is decreased by increasing the exposure value of the current frame, when the intensity difference in the overlapped region is large.

The multi-image-based camera parameter calculator may further include a balance parameter adjuster adjusting a balance parameter using an exposure level ratio using a camera parameter of a current frame of a single image and a camera parameter of a next frame of the single image.

The cost function deriver may derive the cost functions on the basis of the balance parameter.

The optimal parameter calculator may calculate an exposure value at which values of the cost functions are minimized as an optimal camera parameter value.

According to another embodiment of the present disclosure, an apparatus for controlling exposure of a multi-view camera includes: a cost function deriver deriving a first cost function in which values of single image-based camera parameters are reflected on the basis of an exposure value of a next frame by the single image-based camera parameters and deriving a second cost function in which values of multi-image-based camera parameters are reflected on the basis of an exposure value of a current frame by the single image-based camera parameters and an image intensity ratio; and an optimal parameter calculator calculating camera parameters so that the first cost function and the second cost function are minimized.

The apparatus for controlling exposure of a multi-view camera may further include a balance parameter adjuster adjusting a balance parameter used to derive the cost functions, using an exposure level ratio using a camera parameter of a current frame of a single image and a camera parameter of a next frame of the single image.

According to still another embodiment of the present disclosure, a method for controlling exposure of a multi-view camera includes: calculating single image-based camera parameters for each of a plurality of cameras having different views; calculating an image intensity ratio in an overlapped region between images photographed from the plurality of cameras; and calculating multi-image-based camera parameters using the image intensity ratio and the single image-based camera parameters.

BRIEF DESCRIPTION OF THE DRAWINGS

The features and advantages of the present disclosure will be more apparent from the following detailed description taken in conjunction with the accompanying drawings.

DETAILED DESCRIPTION

Figure 1:
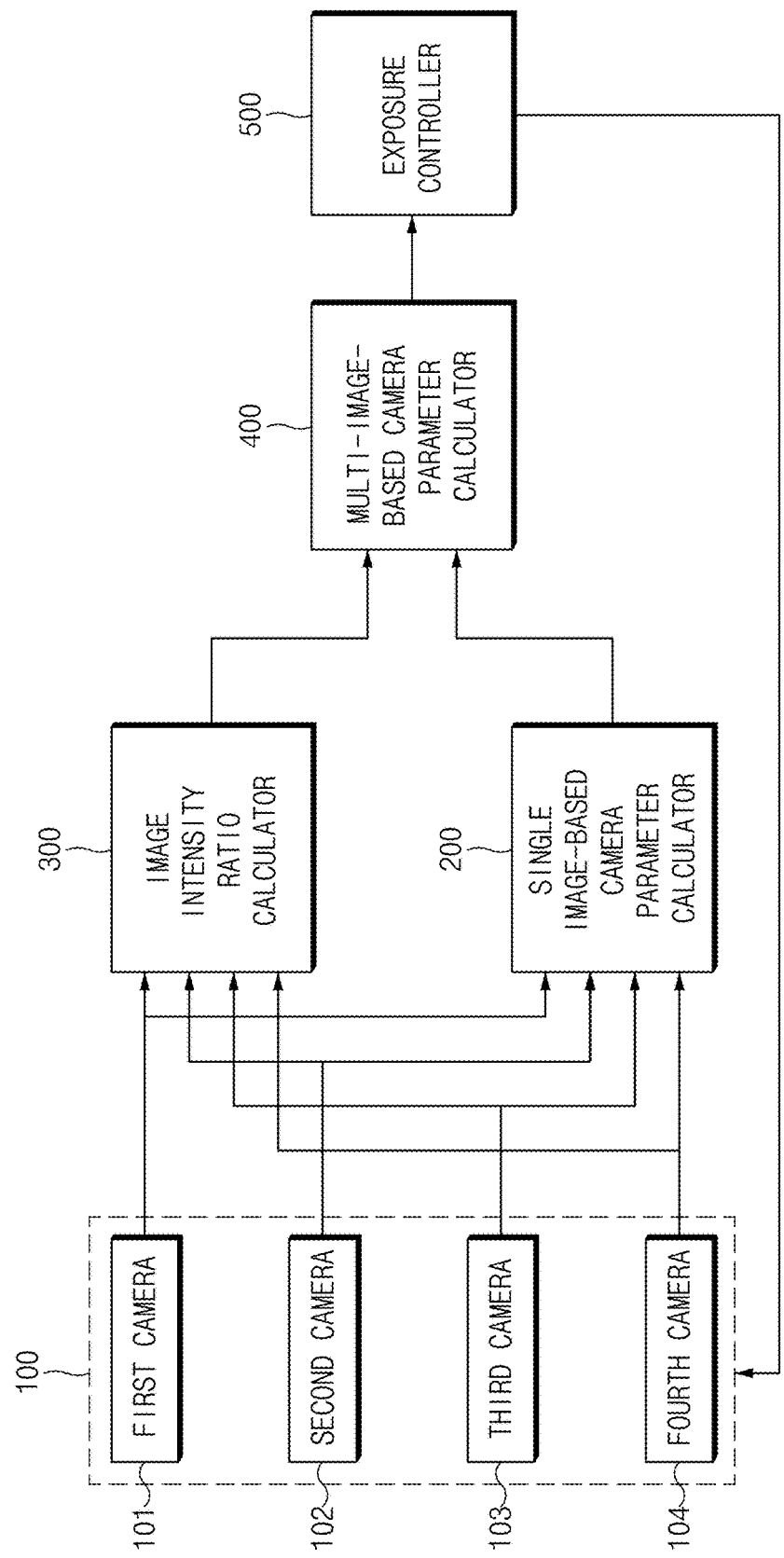
FIG. 1 is a block diagram illustrating a configuration of a system for controlling exposure of a multi-view camera according to an embodiment of the present disclosure.

Hereinafter, embodiments of the present disclosure will be described in detail with reference to the accompanying drawings. It is to be noted that in giving reference numerals to components of the accompanying drawings, the same components will be denoted by the same reference numerals even though they are illustrated in different drawings. Further, in describing embodiments of the present disclosure, well-known constructions or functions will not be described in detail in the case in which it is decided that they may unnecessarily obscure the understanding of embodiments of the present disclosure.

Terms 'first', 'second', A, B, (a), (b), and the like, will be used in describing components of embodiments of the present disclosure. These terms are used only in order to distinguish any component from other components, and features, sequences, or the like, of corresponding components are not limited by these terms. In addition, unless defined otherwise, all the terms used in the present specification, including technical and scientific terms, have the same meanings as meanings that are generally understood by those skilled in the art to which the present disclosure pertains. It should be interpreted that terms defined by a generally used dictionary are identical with the meanings within the context of the related art, and they should not be ideally or excessively formally interpreted unless the context clearly dictates otherwise.

In embodiments, a vehicle includes multiple cameras for capturing images around the vehicle from different perspectives. The images may be still images or moving images, i.e., videos. A controller of the vehicle processes the images captured by the cameras to provide an around view monitor (AMV) of the vehicle. The controller may be implemented in one or more chips, circuitry or at least one computing device installed in the vehicle along with software to perform image processing. The controller may also control operation of the multiple cameras.

In embodiments, the controller includes a first module for determining a first desirable exposure for each camera based on the brightness (or intensity) of at least one image (at least one video frame) of the subject camera. The first module may include a single image-based camera parameter calculator 200. In embodiments, the controller determines a first exposure adjustment for each camera based on the first desirable exposure and the current exposure of the camera. The first exposure adjustment may be determined using the cost function C1 of Equation 3.

In embodiments, the controller further includes a second module for determining a second desirable exposure for each camera based on the intensity disparity (brightness difference) between at least one image (at least one video frame) from the subject camera and at least one image from another camera that has an overlapping view angle with the subject camera. The second module computes the intensity disparity based on image components (or pixels) within the overlapping viewing angle. The second module may include an image intensity ratio calculator 300 that generates an image intensity ratio between the subject camera and the other camera. The image intensity ratio represents the intensity disparity between the images components from the two cameras within the overlapping viewing angle. The second module may include a multi-image-based camera parameter calculator 400. In embodiments, the controller determines a second exposure adjustment for each camera based on the second desirable exposure and the current exposure of the subject camera. The second exposure adjustment may be determined using the cost function C2 of Equation 3.

In embodiments, the controller further includes a third module that generates a third exposure adjustment for each camera computed based on the first exposure adjustment and the second exposure adjustment for the subject camera. The third exposure adjustment may be determined using Equation 4. In embodiments, the third module may further control adjustment of the exposure of each camera using the third exposure adjustment obtained for the subject camera. Subsequently, the first, second and third modules perform the above-described functions using the images obtained from the adjusted exposure of the cameras to produce the first, second and third exposure adjustments for each camera again.

In embodiments of the present disclosure, as an image processing method for consistent around view monitoring (AVM) image quality, a method for obtaining optimal parameters of multiple cameras constituting the AVM using images and camera parameters input from the previous camera frame and a current frame is suggested. Here, the obtained optimal parameters may be calculated in consideration of an optimal numerical value at a single camera view as well as an optimal numerical value for minimizing a difference between the multiple cameras.

Hereinafter, embodiments of the present disclosure will be described in detail with reference to FIGS. 1 to 9.

FIG. 1 is a block diagram illustrating a configuration of a system for controlling exposure of a multi-view camera according to an embodiment of the present disclosure.

The system for controlling exposure of a multi-view camera according to an embodiment of the present disclosure includes a multi-view camera 100, a single image-based camera parameter calculator 200, an image intensity ratio calculator 300, a multi-image-based camera parameter calculator 400, and an exposure controller 500.

The multi-view camera 100 includes a plurality of cameras 101, 102, 103, and 104 of which photographing directions are different from each other, and may be implemented by a plurality of cameras 100 used in an around view monitoring (AVM) system in embodiments of the present disclosure. That is, a first camera 101 photographs the front of a vehicle, a second camera 102 photographs the left of the vehicle, a third camera 103 photographs the right of the vehicle, and a fourth camera 104 photographs the rear of the vehicle. As described above, the multi-view camera may be implemented by the plurality of cameras of which the photographing directions are different from each other, a single camera rotated to have a plurality of photographing directions, or the like. The present disclosure is characterized in that camera parameters are calculated so that an intensity difference between images photographed in different directions is minimized when the images are synthesized.

The single image-based camera parameter calculator 200 generates a plurality of virtual images for each of image data photographed in the plurality of cameras 101, 102, 103, and 104, extracts feature values of each of the plurality virtual images to generate a plurality of feature images, and calculates single image-based camera parameters maximizing the feature values.

$$E_{t+1} = \text{function } S(\hat{\gamma}, E_t) \qquad \text{[Equation 1]}$$

$$E_{t+1} = (1 + K_p(L-1)) \cdot E_t$$

$$L = d \cdot \tan\left((2-\hat{\gamma}) \cdot \text{atan}\left(\frac{1}{d}\right) - \text{atan}\left(\frac{1}{d}\right)\right) + 1$$

Here, $E_{t+1}$ is an optimal exposure value in a t+1-th frame in image data photographed from a single camera, that is, a camera parameter. $E_t$, which is an exposure value in a t-th frame in the image data photographed from the single camera, that is, a current camera parameter. $\hat{\gamma}$ is an optimal gamma correction value, and d is a slope angle. Kp is a curve determining variable. Here, the gamma correction value ($\hat{\gamma}$), which is a value indicating directivity into which the camera parameter is to be changed, may be calculated using one image.

Figure 3A:
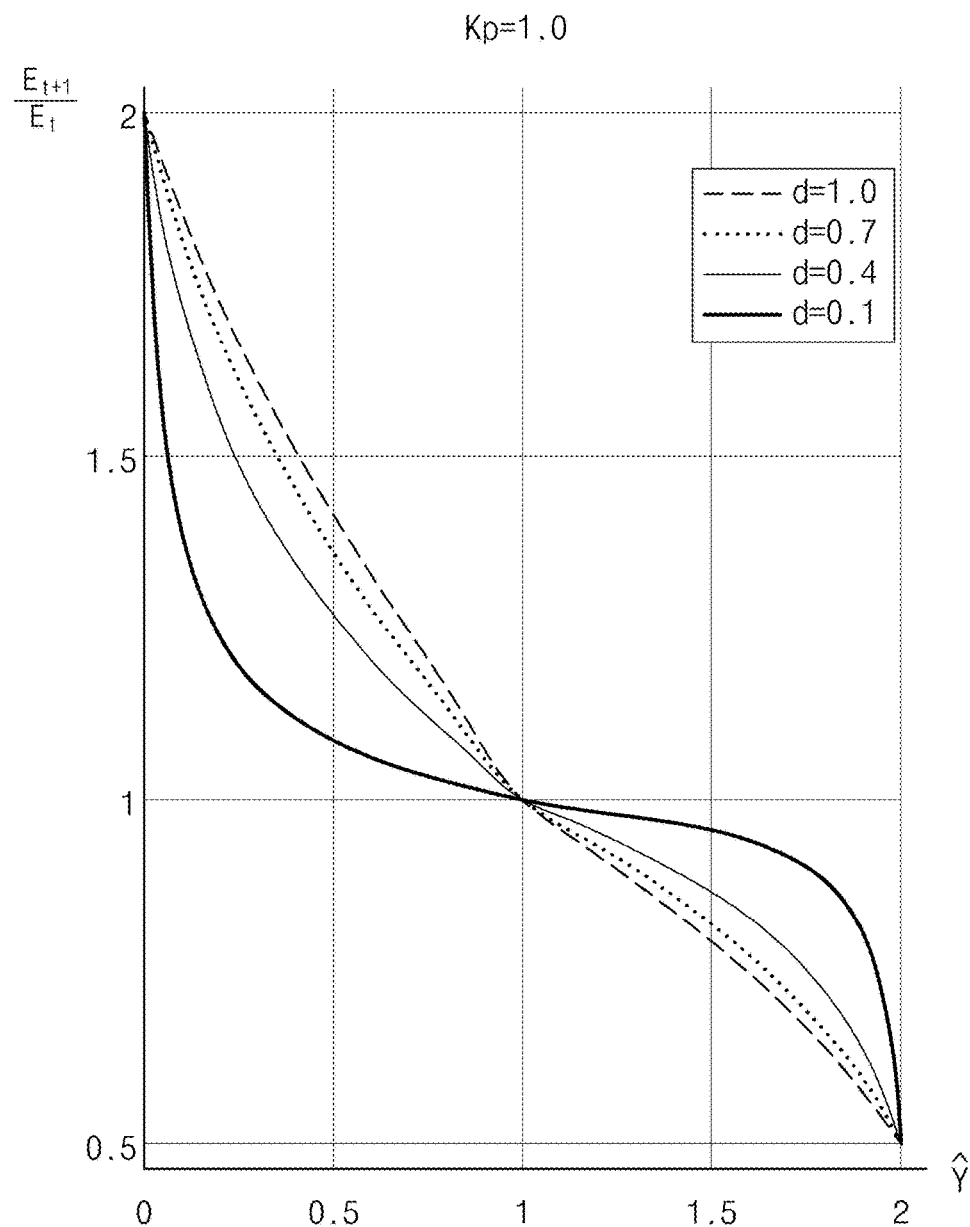
FIG. 3A is a reaction graph of a single image-based camera parameter calculation function when a curve determining variable Kp is 1 according to an embodiment of the present disclosure.
Figure 3B:
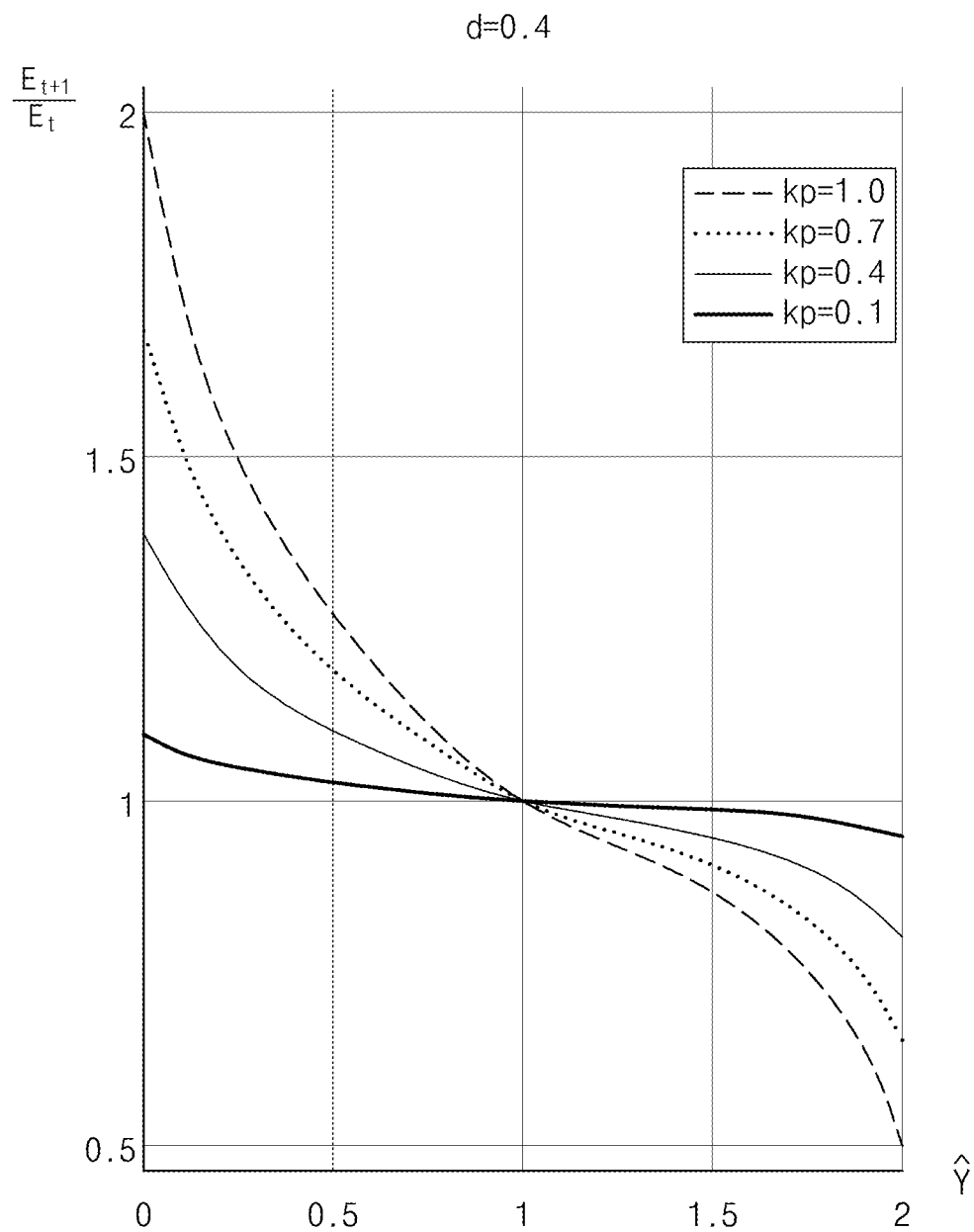
FIG. 3B is a reaction graph of a single image-based camera parameter calculation function when a slope angle d is 4 according to an embodiment of the present disclosure.

In addition, a function S is a function determining a camera exposure value of the next frame depending on the gamma correction value ($\hat{\gamma}$), and a function value of the function S is changed depending on the gamma correction value ($\hat{\gamma}$) as illustrated in FIGS. 3A and 3B. When the gamma correction value ($\hat{\gamma}$) is larger than 1, the camera parameter is decreased depending on ratios of FIGS. 3A and 3B, such that the camera performs photographing in an environment darker than a current environment. To the contrary, when the gamma correction value ($\hat{\gamma}$) is smaller than 1, the camera parameter is increased, such that the camera performs photographing in an environment brighter than the current environment. That is, the above Equation 1 represents a method for determining an optimal exposure value of the next frame using the optimal gamma correction value ($\hat{\gamma}$) estimated on the basis of a current exposure value.

Although an example in which the above Equation 1 is used in order to calculate the single image-based camera parameters has been described in embodiments of the present disclosure, embodiments of the present disclosure is not limited thereto.

FIGS. 3A and 3B are graphs illustrating a relationship between a gamma correction value ($\hat{\gamma}$) and an exposure level ratio $$\left(\frac{E_{t+1}}{E_t}\right).$$

That is, FIG. 3A is a reaction graph of a single image-based camera parameter calculation function when a curve determining variable Kp is 1 according to an embodiment of the present disclosure, and FIG. 3B is a reaction graph of a single image-based camera parameter calculation function when a slope angle d is 4 according to an embodiment of the present disclosure. Referring to FIGS. 3A and 3B, an exposure level control function is exponentially increased or decreased, such that exposure level control performance may be further improved.

The image intensity ratio calculator 300 calculates an image intensity ratio on the basis of a median filtering algorithm and a mean filtering algorithm. Here, the image intensity ratio ($r_{ij}$) may be calculated through the following Equation 2.

$$r_{ij} = \text{median}\left(\frac{\text{mean}(P_j)}{\text{mean}(P_i)}\right) \quad \text{[Equation 2]}$$

Here, $P_i$ means a pixel value of an image patch defined in an image of an i-th camera, and $P_j$ means a pixel value of an image patch defined in an image of a j-th camera. That is, the image intensity ratio calculator 300 calculates an intensity ratio, which is an intensity difference value in an overlapped region between the image of the i-th camera and the image of the j-th camera.

For example, an overlapped region is partially generated at the time of synthesizing a front image of the vehicle and a left image of the vehicle, and an intensity difference is generated in the overlapped region. Therefore, an intensity ratio of the overlapped region is calculated, thereby making it possible to allow a camera exposure parameter to be calculated in consideration of the intensity ratio. That is, when the image intensity difference in the overlapped region is large, a parameter value of a current camera is increased using the intensity ratio $r_{ij}$ to decrease the intensity difference of the overlapped region.

Referring to the above Equation 2, a median of a value obtained by dividing a mean value of the pixel value $P_j$ of the image patch by a mean value of Pi is calculated as the image intensity ratio $r_{ij}$.

The multi-image-based camera parameter calculator 400 derives a cost function $C_1$ in which values of the single image-based camera parameters are reflected and a cost function $C_2$ in which values of a multi-image-based camera parameters are reflected. That is, when the image intensity difference in the overlapped region is large, the cost function $C_2$ is derived so as to increase the parameter value of the current camera is increased using the intensity ratio $r_{ij}$ to decrease the intensity difference of the overlapped region.

Here, the cost functions $C_1$ and $C_2$ are derived by the following Equation 3.

$$C_1 = \|O^i - E_{t+1}^i\|^2$$

$$C_2 = \|O^i - r_{ij} \cdot E_t^i\|^2 \quad \text{[Equation 3]}$$

Here, $O^i$ means an optimal exposure value of the i-th camera, $E_{t+1}^i$ is an exposure parameter of the i-th camera at a point in time t+1, and $E_t^i$, which is an exposure parameter of the i-th camera at a point in time t, means a current parameter.

The following Equation 4 is an equation for calculating an optimal exposure value $O^i$ at which the cost functions $C_1$ and $C_2$ are minimized.

$$\text{argmin}_{O^i}\left\{\sum_i\left(\alpha \cdot C_1(i) + \frac{1-\alpha}{N}\sum_{j \in \Omega(i)} C_2(i,j)\right)\right\} \quad \text{[Equation 4]}$$

Here, $\alpha$ is a balance parameter, and N is a total number of cameras.

The balance parameter $\alpha$ may be calculated using an exposure level ratio ($E_{t+1}^i/E_t^i$) as represented by the following Equation 5.

$$\alpha = \begin{cases} R/2 & \text{for } R \geq 1 \\ (1-R)+0.5 & \text{for } R < 1 \end{cases} \quad \text{[Equation 5]}$$

$$R = E_{t+1}^i/E_t^i$$

Here, $O^i$ means an optimal exposure value of the i-th camera, $E_{t+1}^i$, which is an exposure parameter of the i-th camera at a point in time t+1, and $E_t^i$, which is an exposure parameter of the i-th camera at a point in time t, means a current parameter.

Referring to the above Equation 5, the multi-image-based camera parameter calculator 400 determines the balance parameter ($\alpha$) using the single image-based next parameter $E_{t+1}^i$ and the current parameter $E_t^i$ obtained from the above Equation 1. That is, when a feature amount of the image is small, a difference value between $E_{t+1}^i$ and $E_t^i$ becomes large, such that the balance parameter ($\alpha$) is also determined to be a large value. In a situation in which a gradient of an exposure value of a single camera should be large, the balance parameter $\alpha$ is increased in the following Equation 6, thereby making it possible to increase an influence of the single camera.

The following Equation 6, which is an equation derived from a generalized equation of the above Equation 4 so as to be appropriate for an image coordinate, represents a method of processing the above Equation 4 on the basis of an image.

$$O^i = \text{function } A(E_{t+1}^i, I_i, I_j) \quad \text{[Equation 6]}$$

$$O^i = \alpha \cdot E_{t+1}^i + \frac{(1-\alpha)}{N} \sum_{j \in \Omega(i)} \left(\frac{I_j}{I_i} \cdot E_t^i\right)$$

Here, $I_i, I_j$, means i-th and j-th intensity ratios, $O^i$ means a single image-based optimized exposure parameter calculated in the above Equation 1, $$\frac{(1-\alpha)}{N} \sum_{j \in \Omega(i)} \left(\frac{I_j}{I_i} \cdot E_t^i\right)$$

and is a portion for considering intensity ratios, and the above Equation 6 shows an optimized exposure value in which a multi-view image is considered through the intensity ratios in the i-th camera and the j-th camera.

The system for controlling exposure of a multi-view camera according to an embodiment of the present disclosure may be implemented in a feedback structure in which the exposure controller 500 transfers the exposure value to the multi-view camera 100 and the single image-based camera parameter calculator 200 and the image intensity ratio calculator 300 receive an image to which the exposure value is applied from the multi-view camera 100. The feedback structure may be repeated until the camera exposure value is converged on an optimal value. That is, the multi-view camera 100 may photograph a photograph or a moving picture on the basis of a changed exposure value received from the exposure controller 500, and may provide information on the photographed photograph or moving picture to the single image-based camera parameter calculator 200 and the image intensity ratio calculator 300.

Although a configuration in which the multi-view camera 100, and the single image-based camera parameter calculator 200 and the image intensity ratio calculator 300 are separated from each other has been illustrated in FIG. 1, the single image-based camera parameter calculator 200 and/or the image intensity ratio calculator 300 may be integrated with the multi-view camera 100 to thereby be provided as one module.

In addition, although a configuration in which the plurality of cameras 101, 102, 103, and 104 correspond to one single image-based camera parameter calculator 200 and image intensity ratio calculator 300 has been illustrated in FIG. 1, the single image-based camera parameter calculator 200 and the image intensity ratio calculator 300 may be provided with respect to each of the plurality of cameras 101, 102, 103, and 104.

Figure 2:
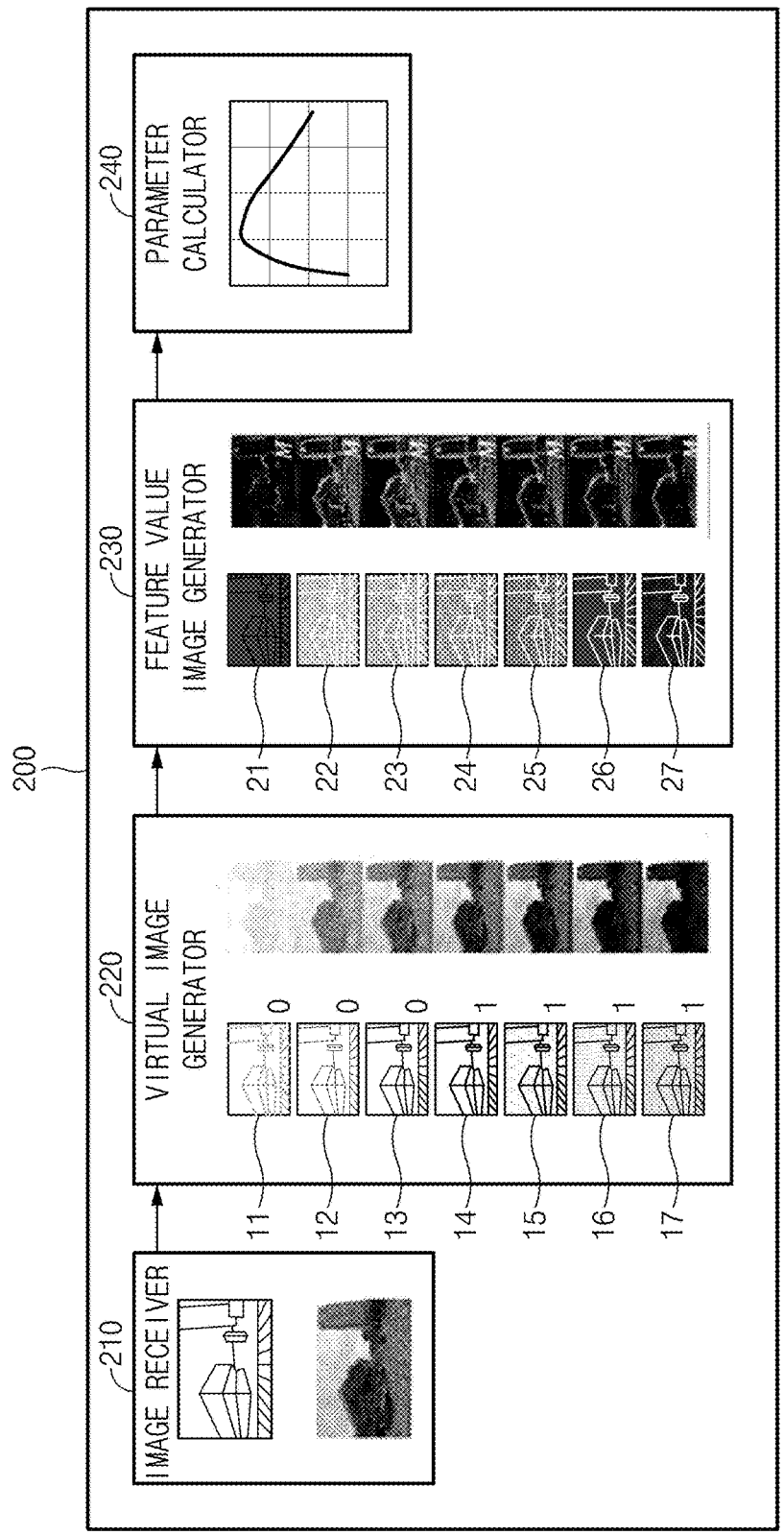
FIG. 2 is a block diagram illustrating a detailed configuration of a single image-based camera parameter calculator of FIG. 1.

FIG. 2 is a block diagram illustrating a detailed configuration of a single image-based camera parameter calculator of FIG. 1.

The single image-based camera parameter calculator 200 extracts a relationship between feature values of an image and a camera exposure value, and repeatedly changes the camera exposure value on the basis of the relationship to calculate an optimal single image-based camera parameter. Here, the feature values include an edge information or gradient information extracted from the image.

To this end, the single image-based camera parameter calculator 200 includes an image receiver 210, a virtual image generator 220, a feature value image generator 230, and a parameter calculator 240.

The image receiver 210 receives images photographed at a specific exposure level (Et) from each of the plurality of cameras 101, 102, 103, and 104.

The virtual image generator 22 variously changes intensities of the photographed images to generate a plurality of virtual images 11, 12, 13, 14, 15, 16, and 17. The feature values of the image are the edge information or the gradient information included in the image.

The feature value image generator 230 extracts feature values of each of the plurality of virtual images to generate a plurality of feature value images. Here, it has been known that magnitudes of gradients in the images have characteristics of heavy tailed distribution. Therefore, most of the gradients have a value relatively smaller than that of a maximum gradient, while large gradients appear on a boundary between a background and a thing. In the case in which gradients extracted from the images are used as they are, the boundary between the background and the thing of which an importance level is relatively low is encoded as important information. Therefore, the feature value image generator 230 corrects actual gradients of pixels using a non-linear function in order to balance importance levels of a small gradient and a large gradient.

The parameter calculator 240 estimates reference estimate using a relationship between the feature values obtained from the plurality of feature value images and intensities, and calculates an optimal single image-based camera parameter for controlling the camera exposure value to be increased when the reference intensity is more intense than the photographed image.

Figure 4:
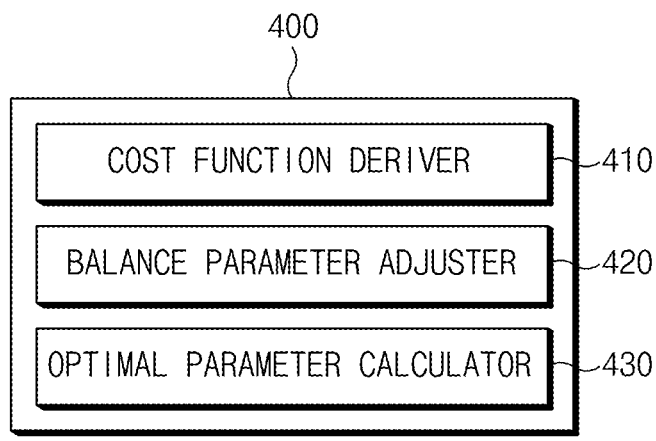
FIG. 4 is a block diagram illustrating a detailed configuration of a multi-image-based camera parameter calculator of FIG. 1.

FIG. 4 is a block diagram illustrating a detailed configuration of a multi-image-based camera parameter calculator of FIG. 1.

The multi-image-based camera parameter calculator 400 includes a cost function deriver 410, a balance parameter adjuster 420, and an optimal parameter calculator 430.

The cost function deriver 410 derives the cost function $C_1$ in which the values of the single image-based camera parameters are reflected and the cost function $C_2$ in which the values of the multi-image-based camera parameters are reflected using the above Equation 3.

The balance parameter adjuster 420 may calculate the balance parameter ($\alpha$) using the exposure level ratio ($E_{t+1}^i/E_t^i$) as represented by the above Equation 5.

The optimal parameter calculator 430 calculates the optimal camera parameter using the intensity ratio $r_{ij}$.

Figure 5:
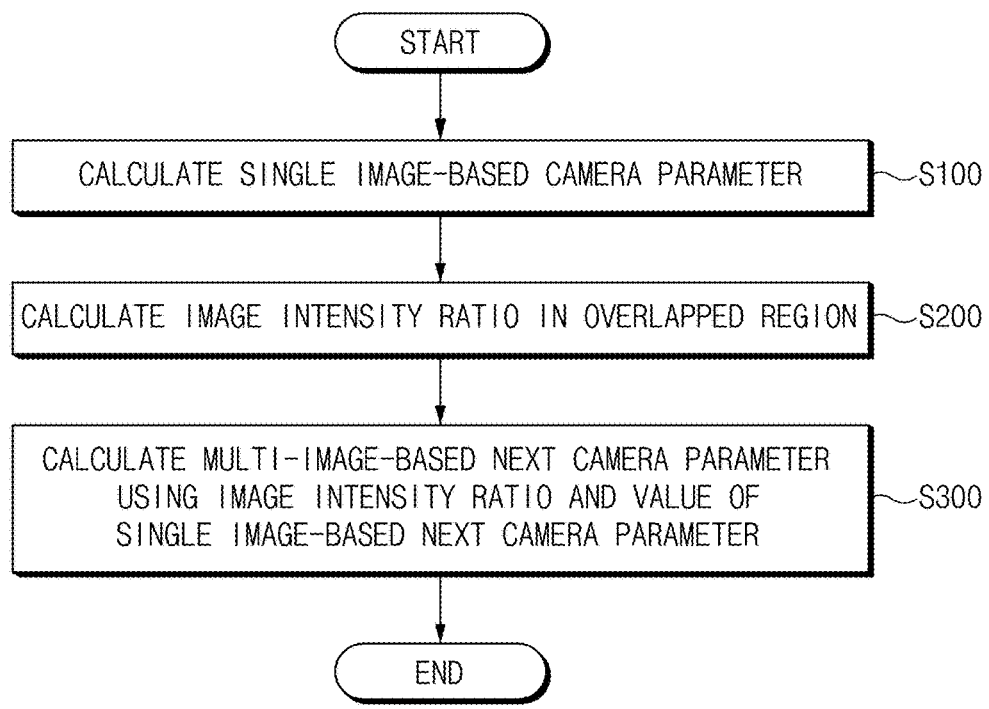
FIG. 5 is a flow chart illustrating a method for controlling exposure of a multi-view camera according to an embodiment of the present disclosure.

Hereinafter, a method for controlling exposure of a multi-view camera according to an embodiment of the present disclosure will be described with reference to FIG. 5.

The single image-based camera parameter calculator 200 calculates the single image-based camera parameters for each of the plurality of cameras (S100).

Then, the image intensity ratio calculator 300 calculates the image intensity ratio in the overlapped region (S200).

Then, the multi-image-based camera parameter calculator 400 calculates the multi-image-based next camera parameter using the image intensity ratio and the value of the single image-based next camera parameter (S300).

Figure 6:
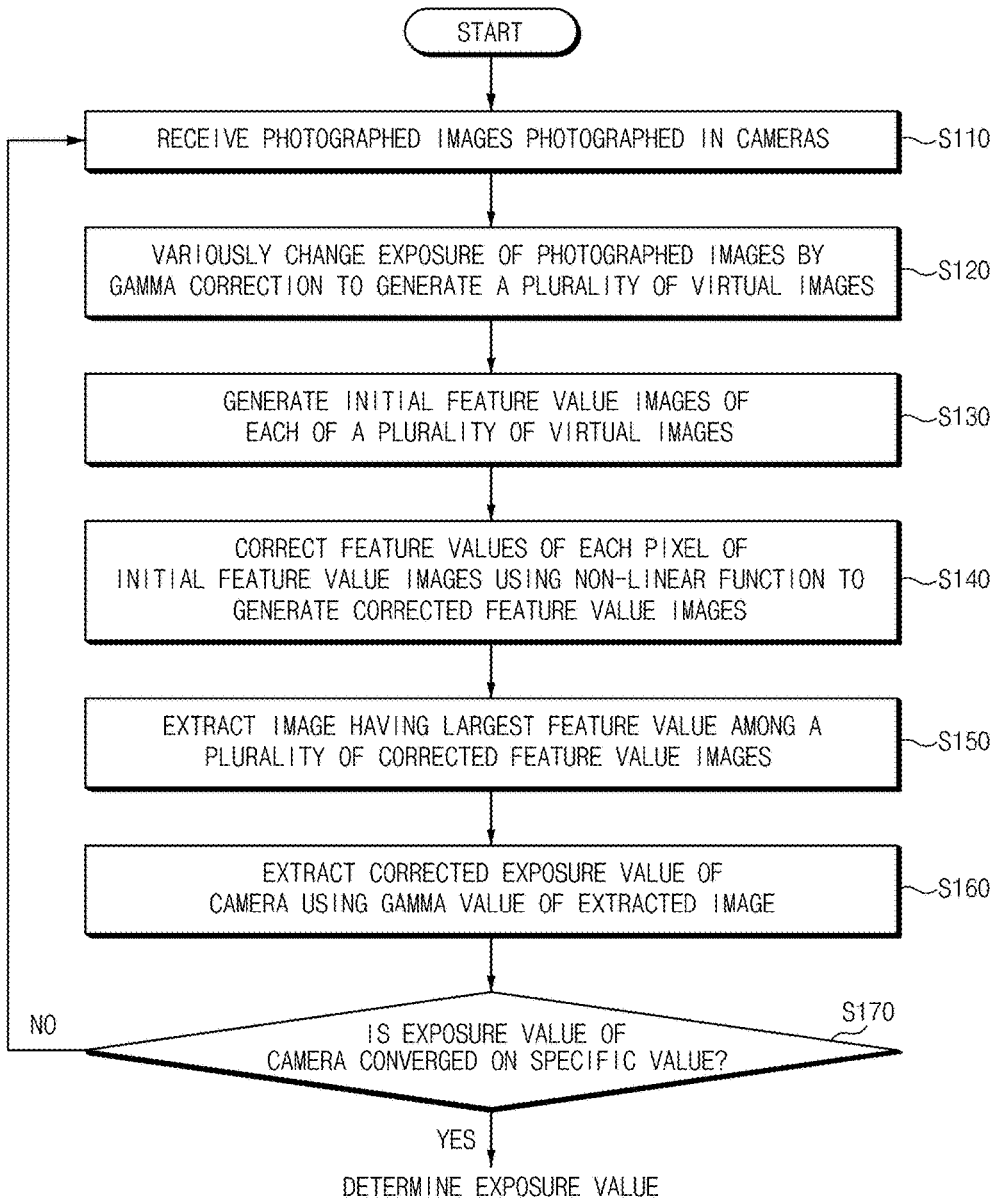
FIG. 6 is a flow chart illustrating a process for calculating a single image-based camera parameter in FIG. 5 in detail.

Hereinafter, a process for calculating the single image-based camera parameter in FIG. 5 will be described in detail with reference to FIG. 6.

First, the single image-based camera parameter calculator 200 variously changes exposure of the photographed image by gamma correction to generate the plurality of virtual images.

The single image-based camera parameter calculator 200 receives the photographed images photographed in each of the plurality of cameras from each of the plurality of cameras (S110), and variously changes the exposure of each of the photographed images photographed in each of the plurality of cameras by the gamma correction to generate the plurality of virtual images (S120).

Then, the single image-based camera parameter calculator 200 generates initial feature value images of each of the plurality of virtual images (S130), and correct feature values of each pixel of the initial feature value images using a non-linear function to generate corrected feature value images (S140).

Then, the single image-based camera parameter calculator 200 extracts an image having the largest feature value among a plurality of corrected feature value images (S150), and extracts a corrected exposure value of the camera using a gamma value of the extracted image (S160).

The single image-based camera parameter calculator 200 decides the exposure value of the camera is converged on a specific value, and calculates the optimal single camera parameter (exposure value) in the case in which the exposure value of the camera is converged on the specific value (S170).

Figure 7A:
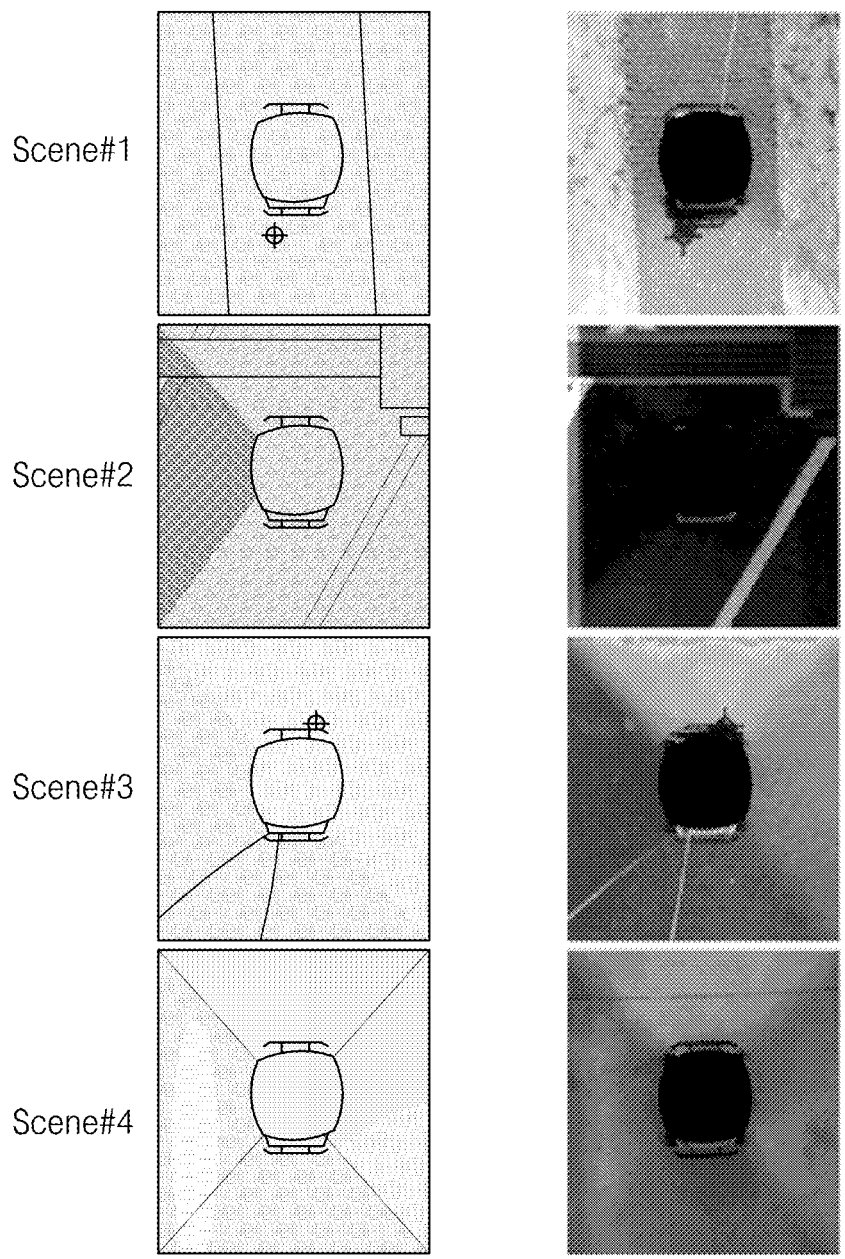
FIGS. 7A to 7C are illustrative views illustrating synthesis of plane images of a vehicle by a multi-view camera of the vehicle according to an embodiment of the present disclosure.
Figure 7B:
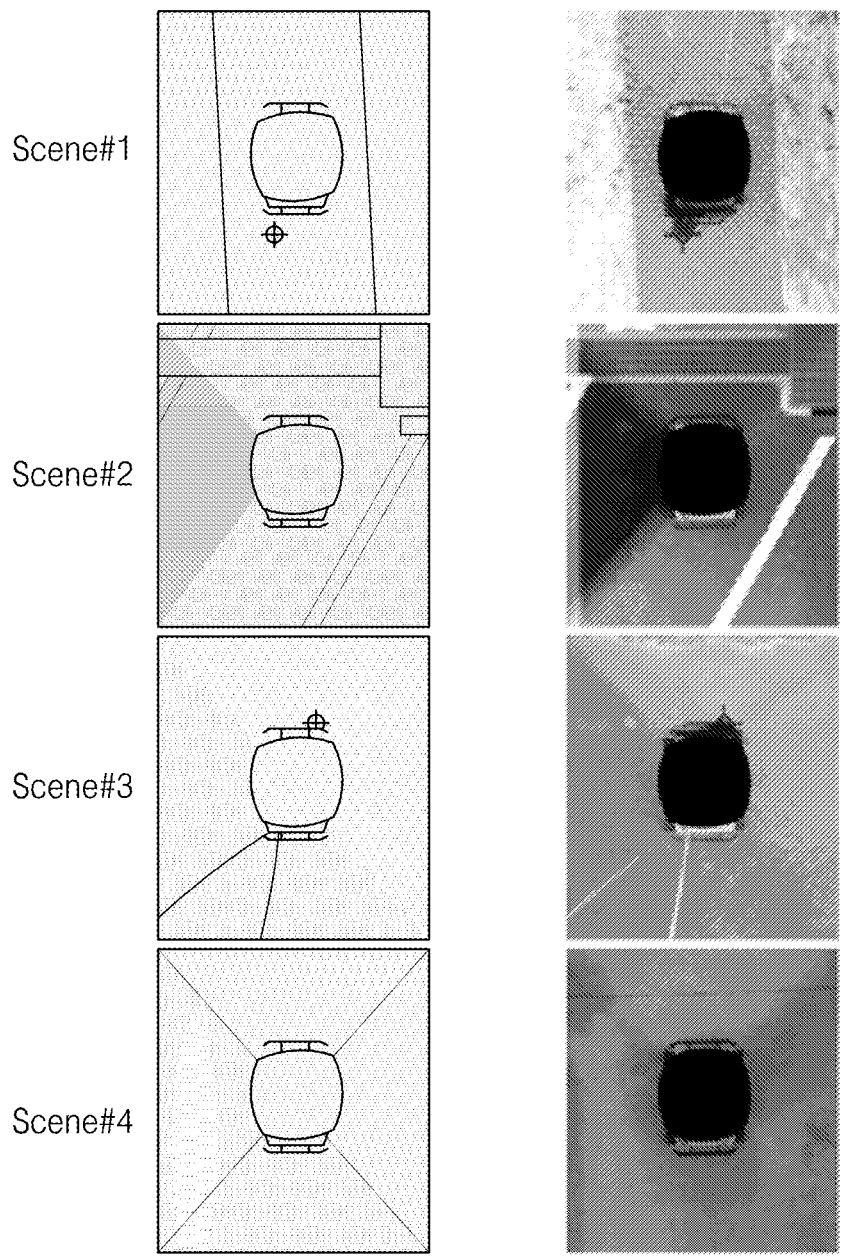
Figure 7C:
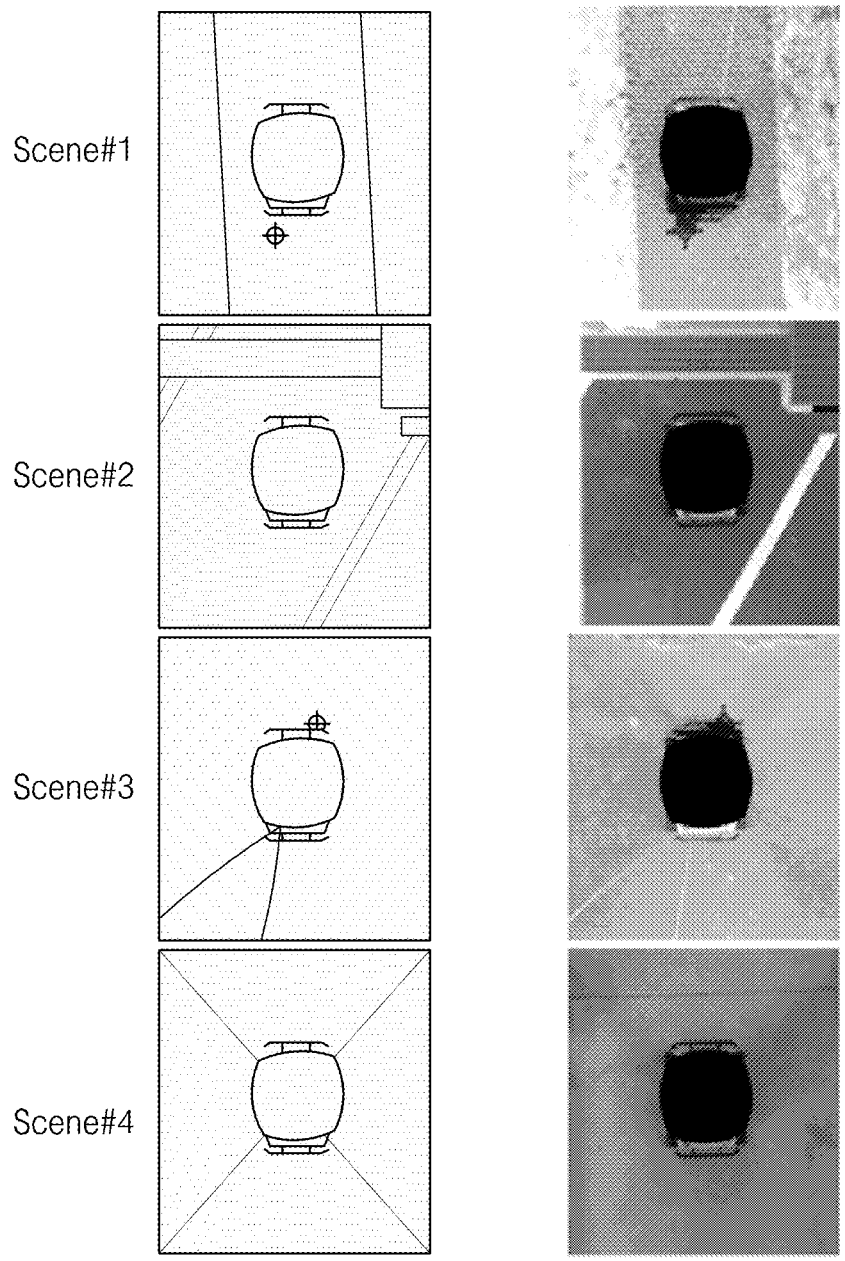

FIGS. 7A to 7C are illustrative views illustrating synthesis of plane images of a vehicle by a multi-view camera of the vehicle according to an embodiment of the present disclosure. FIG. 7A is a view illustrating an example to which an automatic exposure method is applied, FIG. 7B is a view illustrating an example in which independent exposure controls are performed on each camera, and FIG. 7C is a view illustrating an example to which integrated exposure control of a multi-view camera according to an embodiment of the present disclosure is applied.

Referring to FIGS. 7A to 7C, it may be confirmed that synthesis images maintain optimal exposure and a balance between the respective images are improved in FIG. 7C illustrating images by the integrated exposure control of a multi-view camera according to an embodiment of the present disclosure.

Figure 8A:
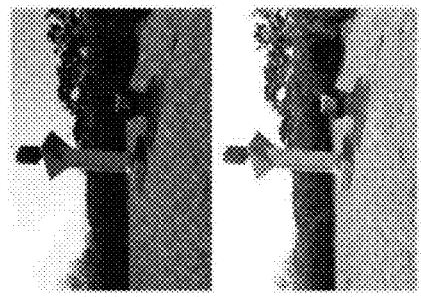
FIGS. 8A to 8D are graphs illustrating images of which exposure are controlled for each scene and stereo matching results for images for each scene according to an embodiment of the present disclosure.
Figure 8A:
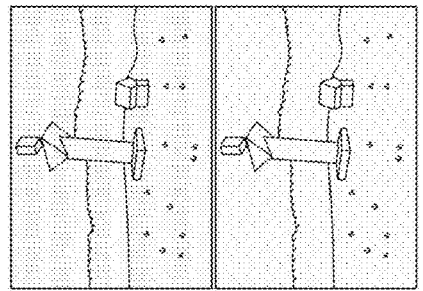
Figure 8B:
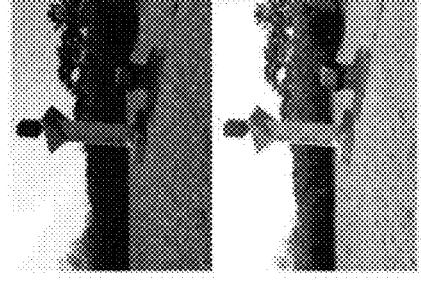
Figure 8B:
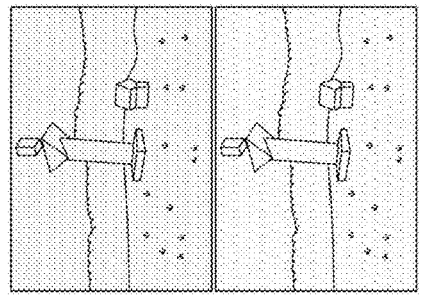
Figures 8C, 8D:
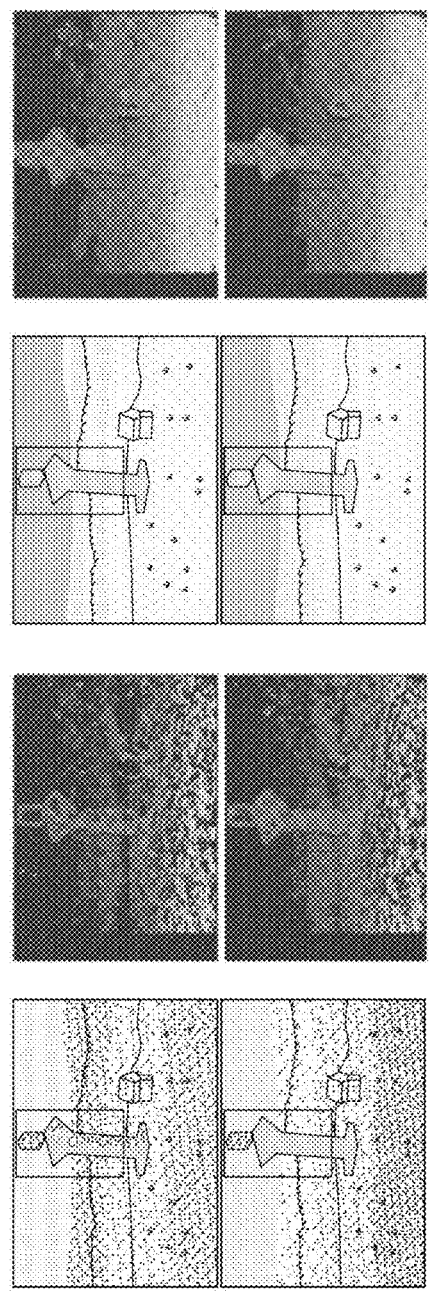

FIGS. 8A to 8D are graphs illustrating images of which exposure are controlled for each scene and stereo matching results for images for each scene according to an embodiment of the present disclosure. FIG. 8A illustrates a comparison between a left image of which exposure is controlled according to an existing scheme and an image of which exposure is controlled according to embodiments of the present disclosure, FIG. 8B illustrates right images of which exposure is controlled, FIG. 8C illustrates block matching results based on left and right images, and FIG. 8D illustrates a comparison between stereo matching results based on left and right images according to an existing scheme and embodiments of the present disclosure. Referring to FIGS. 8A to 8D, it is observed that stereo matching performance is improved in the lower images when compared to that of the upper images.

In embodiments of the present disclosure, in order to correct parameters of the plurality of cameras, the correction of the camera parameters is performed on the basis of a ratio between image intensities in an overlapped region between adjacent cameras.

That is, the system for controlling exposure of a multi-view camera includes a simple mean filter and median filter in order to minimize noise between images and an influence of the noise on an error in overlapped region synthesis. In addition, parameters between the adjacent cameras are corrected so that an intensity ratio between images in the overlapped region becomes minimal. This process is applied to each camera frame, thereby making it possible to obtain an optimal parameter in consideration of both of parameters for a single camera and parameters for a multi-camera.

Generally, in the case in which image data of the plurality of cameras are synthesized in an AVM image, images obtained from the plurality of cameras of which views are different from each other are vulnerable to a change by an illumination environment, such that an image quality difference between a plurality of image data is generated. However, in embodiments of the present disclosure for reducing the image quality difference between the plurality of image data, intensity and color sense differences between the images obtained from the plurality of cameras are minimized, and the camera parameters of each of the plurality of cameras are corrected so that the plurality of cameras have the optimal exposure values in consideration of the gradient by the single camera parameter, thereby making it possible to improve image quality of the AVM image.

That is, in embodiments of the present disclosure, the images are improved by a method (a pre-processing method) of correcting the camera parameters themselves rather than a method (a post-processing method) of correcting the obtained images to minimize loss of the image data and determine the optimal exposure value, thereby making it possible to minimize a difference between the respective images. In addition, in embodiments of the present disclosure, individual exposure controls are not performed on each camera parameter, and a direct integrated exposure control is performed on parameters of multi-view cameras.

In addition, embodiments of the present disclosure can be applied to a method for controlling an exposure value of a signal camera.

Figure 9:
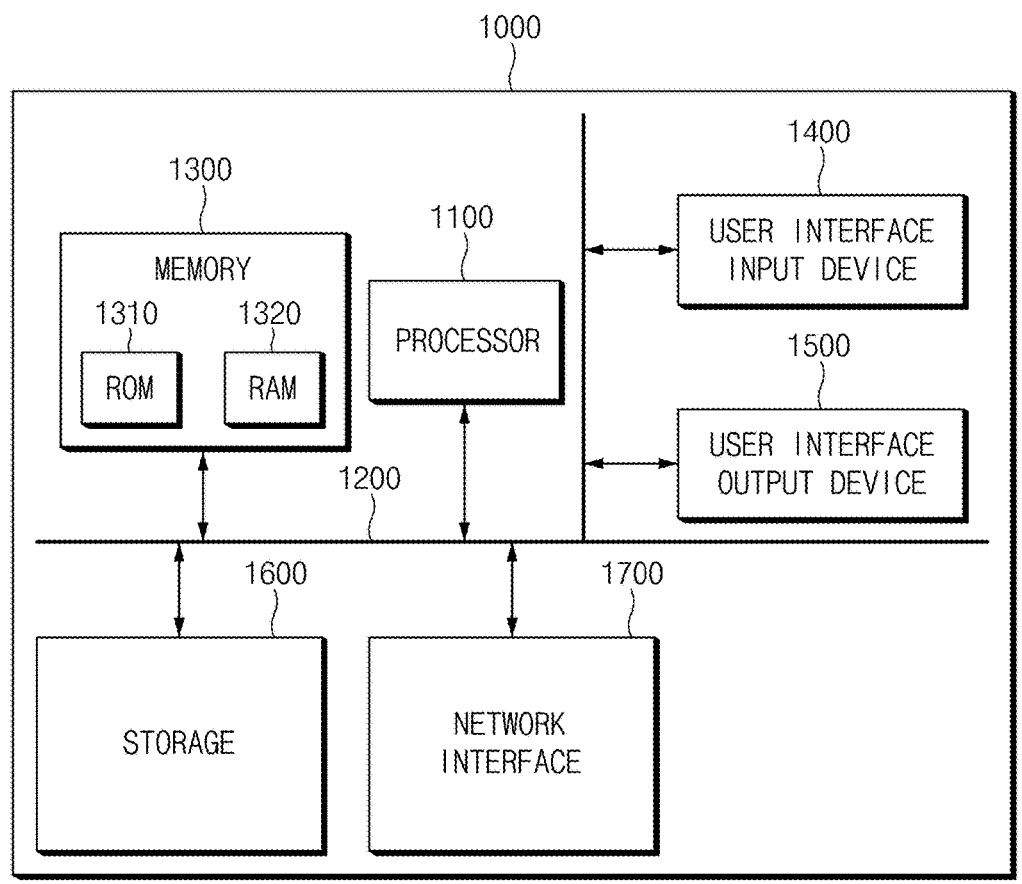
FIG. 9 is a block diagram illustrating a configuration of a computer system to which the method for controlling exposure of a multi-view camera according to an embodiment of the present disclosure is applied.

FIG. 9 is a block diagram illustrating a configuration of a computer system to which the method for controlling exposure of a multi-view camera according to an embodiment of the present disclosure is applied.

Referring to FIG. 9, the computer system 1000 may include at least one processor 1100, a memory 1300, a user interface input device 1400, a user interface output device 1500, a storage 1600, and a network interface 1700 connected to each other through buses 1200.

The processor 1100 may be a semiconductor device executing processing for instructions stored in a central processing unit (CPU) or the memory 1300 and/or the storage 1600. The memory 1300 and the storage 1600 may include various kinds of volatile or non-volatile storage media. For example, the memory 1300 may be a read only memory (ROM) and a random access memory (RAM).

Therefore, steps of a method or an algorithm described in association with embodiments disclosed in the present disclosure may be directly implemented by a hardware or software module executed by the processor 1100, or a combination thereof. The software module may reside in a random access memory (RAM), a flash memory, a read only memory (ROM), an erasable programming ROM (EPROM), an electrically erasable programming ROM (EEPROM), a register, a hard disk, a detachable disk, a storage medium such as a compact disk-ROM (CD-ROM) (that is, the memory 1300 and/or the storage 1600).

An illustrative storage medium may be coupled to the processor 1100, which may read information from the storage medium and write information to the storage medium. As another method, the storage medium and the processor 1100 may also be formed integrally with each other. The processor and the storage medium may also reside in an application specific integrated circuit (ASIC). The ASIC may also reside in a user terminal. As another method, the processor and the storage medium may also reside as individual components in the user terminal.

In embodiments, an image quality difference between the multi-view cameras is minimized, and the camera parameters are controlled so that the multi-view cameras have the optimal exposure values in consideration of the gradient by the single camera parameter, thereby making it possible to improve the image quality of the AVM image.

Hereinabove, although the present disclosure discusses embodiments of the present invention and the accompanying drawings, the present invention is not limited thereto, but may be variously modified and altered by those skilled in the art to which the present disclosure pertains without departing from the spirit and scope of the present disclosure claimed in the following claims.

What is claimed is:

1. A system for controlling exposure of a multi-view camera, comprising:
   a plurality of cameras having different views;
   a single image-based camera parameter calculator configured to calculate single image-based camera parameters for each of the plurality of cameras;
   an image intensity ratio calculator configured to calculate an image intensity ratio corresponding to an image intensity difference in an overlapped region between image data of different view images obtained from the plurality of cameras;
   a multi-image-based camera parameter calculator configured to calculate multi-image-based camera parameters for correcting intensity differences between the different view images of the plurality of cameras based on the single image-based camera parameters and the image intensity ratio; and
   an exposure controller configured to control exposure values of the plurality of cameras based on the multi-image-based camera parameters.

2. The system for controlling exposure of a multi-view camera according to claim 1, wherein the plurality of cameras include at least one from a group consisting of a first camera configured to photograph a front of a vehicle, a second camera configured to photograph a left of the vehicle, a third camera configured to photograph a right of the vehicle, and a fourth camera configured to photograph a rear of the vehicle.

3. The system for controlling exposure of a multi-view camera according to claim 1, wherein the single image-based camera parameter calculator includes:
   a virtual image generator configured to change intensities of each of the image data photographed in the plurality of cameras to generate a plurality of virtual images for each of the image data;
   a feature value image generator configured to extract feature values of each of the plurality of virtual images to generate a plurality of feature value images; and
   a parameter calculator configured to calculate the single image-based camera parameters using a relationship between the feature values obtained from the plurality of feature value images and intensities.

4. The system for controlling exposure of a multi-view camera according to claim 3, wherein the parameter calculator is configured to calculate the single image-based camera parameters so as to be exponentially increased or decreased.

5. The system for controlling exposure of a multi-view camera according to claim 1, wherein the image intensity ratio calculator is configured to calculate the image intensity ratio on the basis of a median filtering algorithm and a mean filtering algorithm.

6. The system for controlling exposure of a multi-view camera according to claim 1, wherein the image intensity ratio calculator is configured to calculate a median of a value obtained by dividing a pixel mean value of image patches defined in first image data photographed in a first camera of the plurality of cameras by a pixel mean value of image patches defined in second image data photographed in a second camera of the plurality of cameras as the image intensity ratio, in an overlapped region between the first image data and the second image data.

7. The system for controlling exposure of a multi-view camera according to claim 6, wherein the multi-image-based camera parameter calculator includes:
   a cost function deriver configured to derive a first cost function in which values of the single image-based camera parameters are reflected on the basis of an exposure value of a next frame by the single image-based camera parameters and further configured to derive a second cost function in which values of the multi-image-based camera parameters are reflected on the basis of an exposure value of a current frame by the single image-based camera parameters and the image intensity ratio; and
   an optimal parameter calculator configured to calculate camera parameters so that the first cost function and the second cost function are minimized.

8. The system for controlling exposure of a multi-view camera according to claim 7, wherein the cost function deriver is configured to derive the second cost function so that the intensity difference in the overlapped region is decreased by increasing the exposure value of the current frame, when the intensity difference in the overlapped region is large.

9. The system for controlling exposure of a multi-view camera according to claim 7, wherein the multi-image-based camera parameter calculator further includes a balance parameter adjuster configured to adjust a balance parameter using an exposure level ratio using a camera parameter of a current frame of a single image and a camera parameter of a next frame of the single image.

10. The system for controlling exposure of a multi-view camera according to claim 9, wherein the cost function deriver is configured to derive the cost functions on the basis of the balance parameter.

11. The system for controlling exposure of a multi-view camera according to claim 10, wherein the optimal parameter calculator is configured to calculate an exposure value at which values of the cost functions are minimized as an optimal camera parameter value.

12. An apparatus for controlling exposure of a multi-view camera, comprising:
   a cost function deriver configured to derive a first cost function in which values of single image-based camera parameters are reflected on the basis of an exposure value of a next frame by the single image-based camera parameters and configured to derive a second cost function in which values of multi-image-based camera parameters are reflected on the basis of an exposure value of a current frame by the single image-based camera parameters and an image intensity ratio;
   an optimal parameter calculator configured to calculate camera parameters for controlling exposure of each of a plurality of cameras so that the first cost function and the second cost function are minimized; and
   an exposure controller configured to control exposure of each of the plurality of cameras based on the camera parameters calculated by the optimal parameter calculator.

13. The apparatus for controlling exposure of a multi-view camera according to claim 12, further comprising a balance parameter adjuster configured to adjust a balance parameter used to derive the cost functions, using an exposure level ratio using a camera parameter of a current frame of a single image and a camera parameter of a next frame of the single image.

14. A method of controlling exposure of a multi-view camera, comprising:
   calculating single image-based camera parameters for each of a plurality of cameras having different views;
   calculating an image intensity ratio in an overlapped region between different view images photographed from the plurality of cameras;
   calculating multi-image-based camera parameters using the image intensity ratio and the single image-based camera parameters; and
   controlling exposure values of each of a plurality of cameras based on the multi-image-based camera parameters.

* * * * *